United States Patent [19]
Bellas et al.

[11] Patent Number: 5,893,766
[45] Date of Patent: Apr. 13, 1999

[54] ELECTRICAL CONNECTOR WITH GROUND CLIP

[75] Inventors: Jeffrey J. Bellas, Columbia, Mo.; Clyde W. Boling, Austin, Tex.; Dennis M. Brunner, Centralia, Mo.; Steven Feldman, Madison, Ohio

[73] Assignee: Minnesota Mining and Manufacturing Company, Saint Paul, Minn.

[*] Notice: This patent is subject to a terminal disclaimer.

[21] Appl. No.: 09/074,827

[22] Filed: May 8, 1998

Related U.S. Application Data

[63] Continuation of application No. 08/678,832, Jul. 12, 1996, Pat. No. 5,749,741.

[51] Int. Cl.$^6$ ........................................ H01R 4/66
[52] U.S. Cl. ........................................ 439/95; 439/946
[58] Field of Search ........................ 439/95, 96, 108, 439/607; 361/737, 753, 718

[56] References Cited

U.S. PATENT DOCUMENTS

| | | | |
|---|---|---|---|
| 4,732,568 | 3/1988 | Hall | 439/676 |
| 4,808,118 | 2/1989 | Wilson et al. | 439/95 |
| 4,842,555 | 6/1989 | Cosmos et al. | 439/609 |
| 4,874,336 | 10/1989 | Marsh | 439/607 |
| 4,924,076 | 5/1990 | Kitamura | 235/492 |
| 5,002,495 | 3/1991 | Tanaka | 439/108 |
| 5,169,323 | 12/1992 | Kawai et al. | 439/108 |
| 5,201,855 | 4/1993 | Ikola | 439/608 |
| 5,207,597 | 5/1993 | Kline et al. | 439/607 |
| 5,275,573 | 1/1994 | McCleerey | 439/159 |
| 5,290,174 | 3/1994 | Woratyla et al. | 439/59 |
| 5,304,070 | 4/1994 | Bertho et al. | 439/157 |
| 5,451,168 | 9/1995 | Shuey | 439/159 |
| 5,478,260 | 12/1995 | Kaufman et al. | 439/108 |
| 5,749,741 | 5/1998 | Bellas et al. | 439/95 |

FOREIGN PATENT DOCUMENTS

| | | | |
|---|---|---|---|
| 0417648 A2 | 3/1991 | European Pat. Off. | G06K 19/07 |
| 0532166 A1 | 3/1993 | European Pat. Off. | H01R 13/648 |
| 0578888 A1 | 1/1994 | European Pat. Off. | G06K 19/077 |
| 0653813 A1 | 5/1995 | European Pat. Off. | H01R 13/648 |
| 0671704 A1 | 9/1995 | European Pat. Off. | G06K 19/077 |
| 0678830 A1 | 10/1995 | European Pat. Off. | G06K 19/077 |

*Primary Examiner*—Neil Abrams
*Assistant Examiner*—T C Patel
*Attorney, Agent, or Firm*—Matthew B. McNutt

[57] ABSTRACT

An electrical connector is provided for use with a circuit card which has a generally planar substrate having multiple conductive elements disposed along at least one edge thereof. Each of the conductive elements is coupled to an electrically conductive trace on the surface of the planar substrate, and at least one conductive cover panel is provided which may be mounted to the planar substrate. An electrical coupling which includes multiple electrical contacts for external connection to the circuit card is provided, and each of the multiple electrical contacts is then coupled to an associated electrical terminal, such as a solder tail, which may then be mated to one of the multiple conductive elements on the planar substrate. A grounding clip is then mounted on at least one of the associated electrical terminals. The grounding clip includes a conductive member which extends outward from the electrical terminal to engage the generally planar conductive cover panel while the conductive cover panel is mounted above the substrate such that at least one electrically conductive trace on the planar substrate is electrically coupled through a conductive element, the electrical coupling and the grounding clip to the conductive cover panel. In this manner, a conductive trace within the circuit card may be simultaneously grounded through the external electrical contacts of the coupling and to the conductive cover panel, minimizing the possible discharge of an electrical charge and preventing electromagnetic emissions by the circuit card.

2 Claims, 3 Drawing Sheets

ELECTRICAL CONNECTOR WITH GROUND CLIP

This application is a continuation of application Ser. No. 08/678,832, filed Jul. 12, 1996, now U.S. Pat. No. 5,749,741, issued May 12, 1998.

BACKGROUND OF THE INVENTION

1. Technical Field

The present invention relates, in general, to improvements in electrical connectors and, in particular, to improvements in ground connectors for utilization with circuit cards. Still more particularly, the present invention relates to a conductive grounding clip which may be utilized to selectively ground a particular electrically conductive terminal and a substrate ground path to a conductive cover plate of a circuit card.

2. Description of the Related Art

Small-scale planar integrated circuit cards, commonly referred to in the art as "memory cards" have become increasingly popular for use in notebook, laptop and desktop computers, as well as other consumer products. Standard specifications from the Personal Computer Memory Card International Association (PCMCIA) and the Japan Electronic Industry Development Association (JEIDA) have helped to expand this relatively new industry. Although commonly referred to as "memory cards," such devices are by no means limited to data storage applications. For example, such examples may perform various I/O functions for modem and local-area network applications.

Currently, the PCMCIA standard cards incorporate a 68-pin female connector at one end and are available in multiple formats. Type I cards have a thickness of 3.3 millimeters. Type II cards perform I/O functions as modems and local-area network applications. The side edges of Type II cards are 3.3 millimeters thick; however, the main body of the cards is 5 millimeters thick. Type III cards are not really "cards" but rather 1.8-inch hard disk drives having a 10.5-millimeter-thick housing. Again, however, these cards are equipped with outside edges of 3.3 millimeters.

Such cards typically comprise a generally rectangular frame which includes an opening in either a top surface or a bottom surface thereof or, in some constructions, in both surfaces. The opening receives a circuit board and a panel or cover, then closes the opening and then closes the circuit board within the frame. A separate frame may not be utilized in certain applications, and in such applications, the circuit board is simply sandwiched between a pair of cover panels.

The circuit board utilized in such cards typically includes a generally planar substrate with at least one electrical component mounted thereon. The electrical components may include semi-conductor devices, integrated circuits, batteries, or the like.

A problem with such cards and other similar accessories is the build-up of electrical charge within the card or the creation of excess electromagnetic emissions by such cards. Electrical charges are typically built up within such a card during handling since the card is generally a portable instrument which is often carried by a user. When a card bearing an electrical charge is inserted into an electronic apparatus or the connector thereof, the charges flow to the electronic apparatus through the connecting terminals. Thus, it is imperative that an appropriate ground be established either to prevent unwanted electrical charge from damaging the device, or to minimize the electromagnetic emissions of such cards.

Numerous examples of attempts at grounding a circuit card exist in the prior art. For example, U.S. Pat. No. 5,398,154 discloses a card-grounding apparatus which includes means for discharging any static electrical charge on the card prior to mating of the card and device context by utilizing a frame having opposite sides which are conductive by providing a grounding terminal within the device into which the card is inserted. European Patent Application 0 584 728 A2 discloses a grounded memory card which also includes conductive tabs on the card cover which is utilized to create a ground path to the circuit card.

European Patent Application 0 671 704 A1 also discloses an integrated circuit card which includes a circuit board mounted in a frame wherein ground circuits are clipped to the circuit board and utilized to create an ohmic connection with a conductive trace on the circuit board. Additionally, recently integrated circuit cards have been manufactured which include a designated conductive pad on the circuit card and means for coupling that conductive pad to the conductive cover plate utilizing a spring or similar conductive element which is physically placed between the circuit card and the cover.

While each of these systems discloses a technique for protecting an integrated circuit card from an unwanted electrical charge and minimizing the electromagnetic emissions of such cards, the complexity of manufacturing of cards including these grounding clips is substantially increased. Additionally, in cards which utilize a separate grounding clip which must be retained between the integrated circuit card and the conductive cover plate, the possibility exists that the conductive element may be lost or misplaced during vibration of the integrated circuit card.

It should therefore be evident that a need exists for an efficient technique for providing a ground connection in a circuit card.

SUMMARY OF THE INVENTION

It is therefore one object of the present invention to provide an improved electrical connection.

It is another object of the present invention to provide an improved ground connection for utilization within a circuit card.

It is yet another object of the present invention to provide a conductive grounding clip which may be utilized to selectively ground a particular electrically conductive terminal and a substrate ground path to a conductive cover plate of a circuit card.

The foregoing objects are achieved as is now described. An electrical connector is provided for use with a circuit card which has a generally planar substrate having multiple conductive elements disposed along at least one edge thereof. Each of the conductive elements is coupled to an electrically conductive trace on the surface of the planar substrate, and at least one conductive cover panel is provided which may be mounted to the planar substrate. An electrical coupling which includes multiple electrical contacts for external connection to the circuit card is provided, and each of the multiple electrical contacts is then coupled to an associated electrical terminal, such as a solder tail, which may then be mated to one of the multiple conductive elements on the planar substrate. A grounding clip is then mounted on at least one of the associated electrical terminals. The grounding clip includes a conductive member which extends outward from the electrical terminal to engage the generally planar conductive cover panel while the conductive cover panel is mounted above the substrate such that at least one electrically conductive trace on the planar substrate is electrically coupled through a conductive element, the electrical coupling and the grounding clip to the conductive cover panel. In this manner, a conductive trace within the circuit card may be simultaneously grounded through the external electrical contacts of the coupling and to the conductive cover panel, minimizing the possible damage due to discharge of an electrical charge and preventing electromagnetic emissions by the circuit card.

The above as well as additional objectives, features and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
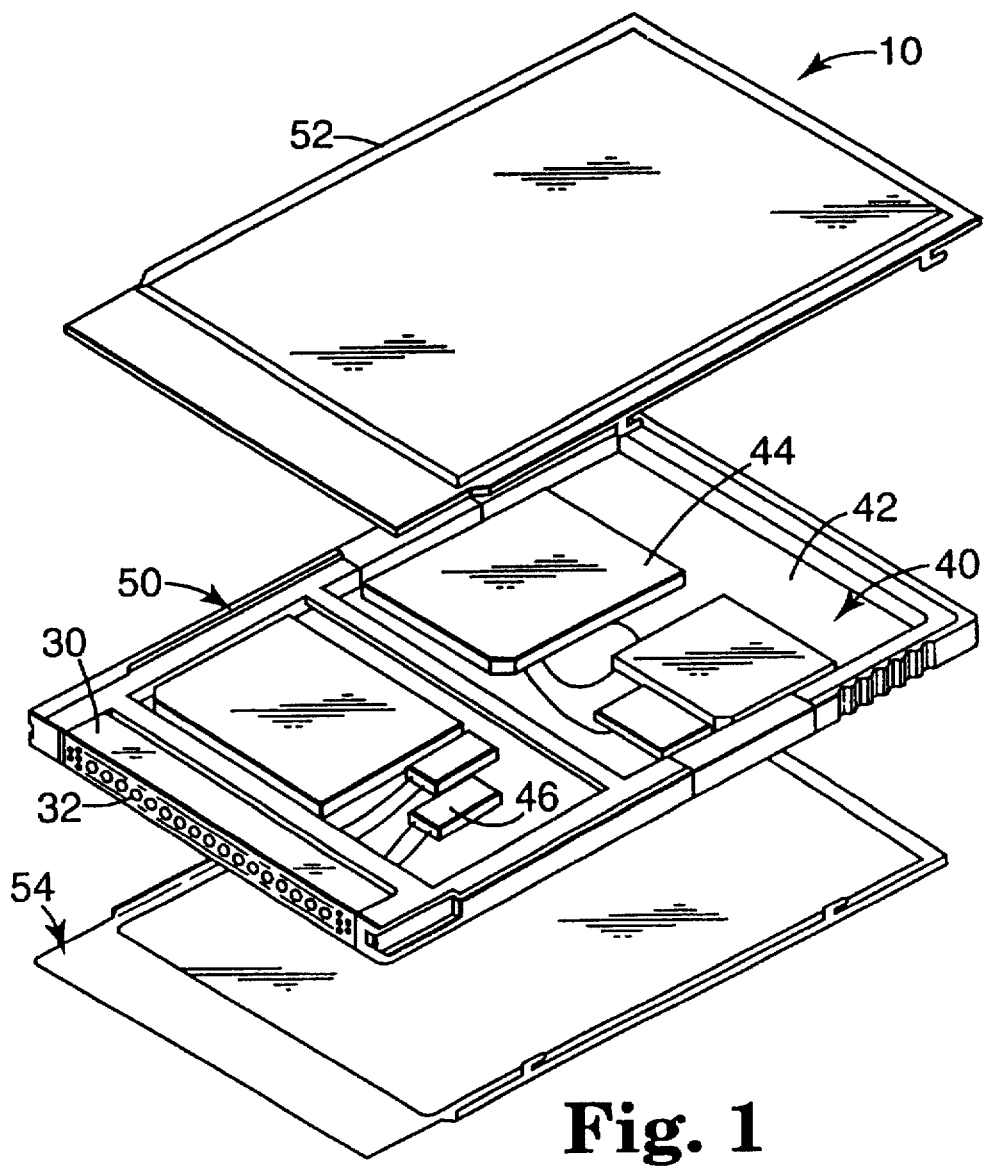
FIG. 1 is an exploded isometric view of a circuit card which may utilize the electrical connector of the present invention.

With reference now to the figures and in particular with reference to FIG. 1, there is depicted an exploded isometric view of a circuit card 10 which may be utilized to implement the electrical connection of the present invention. As illustrated, circuit card 10 includes a frame body 50 which is utilized to mount a circuit card assembly 40. Circuit card assembly 40 includes a generally planar substrate, such as circuit board 42, and a plurality of circuit components 44 are mounted thereon. Of course, those skilled in the art will appreciate that circuit card 10 may comprise an extender or other type of connector which does not utilize circuit components 44. In the depicted embodiment of the present invention, a plurality of conductive traces 46 are also depicted. Such traces may be formed by plating a metallic substance on the surface of a printed circuit board in a manner well-known to those having ordinary skill in the art.

An upper and lower electrically conductive cover 52 and cover 54 are also provided and, when assembled, attach to the upper and lower surface of frame body 50 to form a completed circuit card. As illustrated, an electrical coupling 30 is also provided. Electrical coupling 30, in a manner which will be explained in greater detail herein, includes a plurality of electrical contacts 32 which may be utilized to provide an external electrical connection to circuit card 10.

Figure 2:
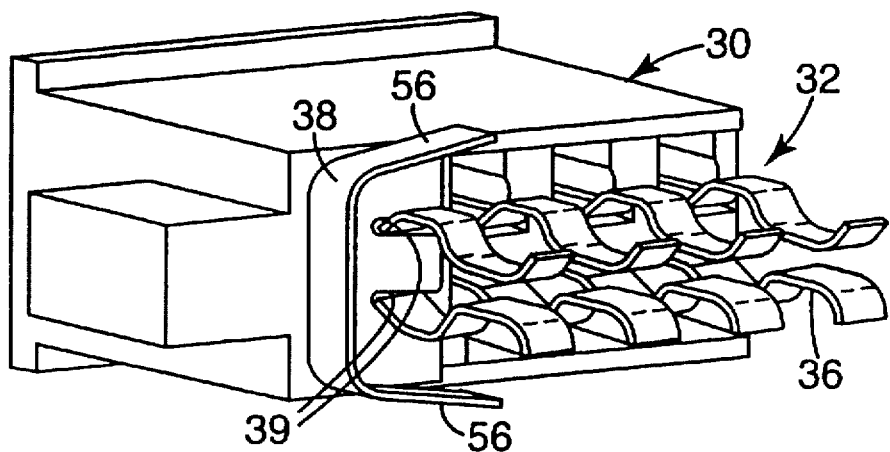
FIG. 2 is a perspective view of an electrical coupling and grounding clip which may be utilized to implement the electrical connector of the present invention.

Referring now to FIG. 2, there is depicted a perspective view of electrical coupling 30 and a ground clip which may be utilized to implement the electrical connection of the present invention. As illustrated, electrical coupling 30 includes a plurality of electrical terminals 36. In the depicted embodiment of the present invention, each electrical terminal 36 comprises a pair of diametrically opposed solder tails which, as those having ordinary skill in the art will appreciate, may be utilized to provide an electrical connection to conductive elements disposed along one edge of planar substrate 42. Additionally, although only four pairs of solder tail electrical terminals are depicted, those having ordinary skill in the art will appreciate that, typically, a much larger number of electrical terminals are provided.

Next, in accordance with an important feature of the present invention, it may be seen that grounding clip 38 has been mounted onto the left-most pair of electrical terminals 36. Grounding clip 38 is constructed of a metallic conductive material such as stainless steel or a tin/lead-plated copper alloy and includes a pair of slits which are sized appropriately so as to permit grounding clip 38 to fit snugly over a pair of electrical terminals 36. One of the slits provided is preferably tapered in order to permit grounding clip 38 to be mounted snugly to a pair of electrical terminals 36 and sized to prohibit electrical contact with an adjoining pair of electrical terminals 36. Additionally, grounding clip 38 preferably includes a pair of opposed compliant conductive members 56 which, in a manner which will be explained in greater detail herein, may be utilized to provide an electrical connection between a conductive element of planar substrate 42 and electrically conductive cover 52 or 54.

Figure 3:
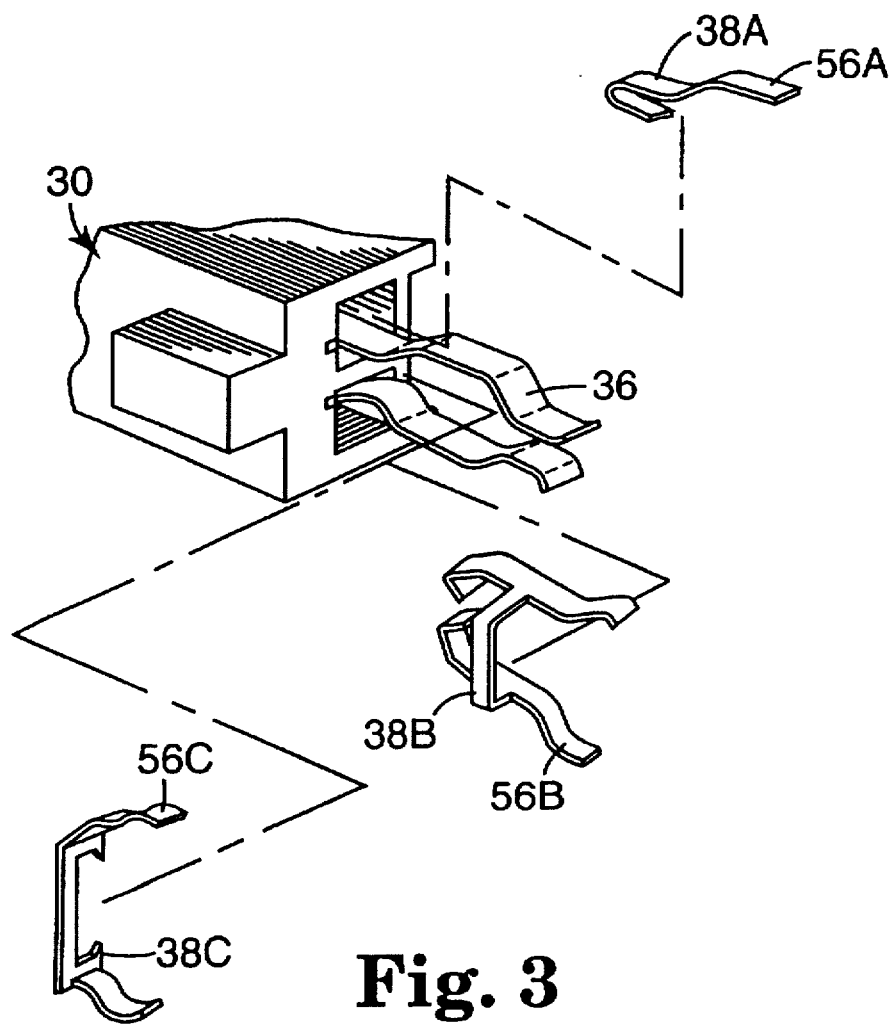
FIG. 3 is an exploded cutaway view of the electrical coupling of FIG. 2 and multiple alternate grounding clip embodiments which may be utilized to provide the electrical connection of the present invention.

With reference now to FIG. 3, there is depicted an exploded cutaway view of electrical coupling 30 of FIG. 2 and multiple alternate grounding clip embodiments which may be utilized to implement the electrical connection of the present invention. As above, each grounding clip mounts to one or more electrical terminals 36 within electrical coupling 30. For example, grounding clip 38A, including compliant conductive member 56A, may be mounted to the upper terminal of electrical terminals 36 and placed within the aperture within which electrical terminal 36 is mounted, providing a conductive path between a conductive trace on planar substrate 42 and electrically conductive cover 52 or 54. Similarly, grounding clip 36B provides a pair of compliant conductive members 56B which provide a similar electrical connection. Finally, grounding clip 36C demonstrates yet another alternate embodiment of a grounding clip which may be utilized with the novel electrical coupling of the present invention. Of course, those skilled in the art will appreciate that a grounding clip may be provided by integrally forming a conductive element as a part of one or more electrical terminals, as will be illustrated in greater detail herein.

Figure 4:
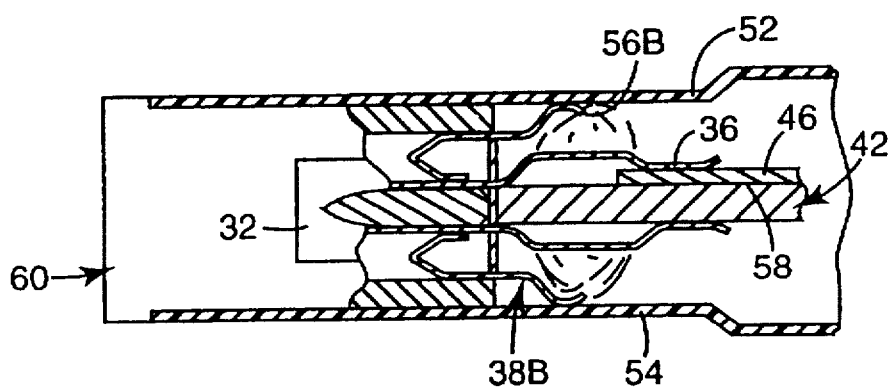
FIG. 4 is a sectional view of the electrical coupling of FIG. 3.

Referring to FIG. 4, there is depicted a sectional view of electrical coupling 30 of FIG. 3 which illustrates the manner in which the grounding clip of the present invention may be utilized to provide an electrical connection between selected elements on planar substrate 42 and electrically conductive cover plate 52 or 54.

As illustrated, planar substrate 42 is mounted between a pair of electrical terminals 36. Upper electrical terminal 36 is in electrical contact with a conductive trace 46 by making an ohmic connection with conductive element 58 at the end of a conductive trace 46. A grounding clip 38B is mounted within the apertures which serve to mount electrical terminals 36 and compliant conductive members 56B, which then serves to provide an ohmic connection between grounding clip 38B and electrically conductive cover plates 52 and 54.

In this manner, an electrical connection through electrical contact 32, by means of a connector inserted through aperture 60, can make direct electrical contact via electrical terminals 36 and conductive element 58 with conductor trace 46 on planar substrate 42. By placing grounding clip 38B on a selected pair of electrical terminals 36, the particular conductive element 58 chosen may be directly grounded via electrical terminals 36, grounding clip 38B and compliant conductive member 56B to electrically conductive cover plates 52 and 54, in addition to an electrical ground connection which can be accomplished via electrical contact 32.

Figure 5:
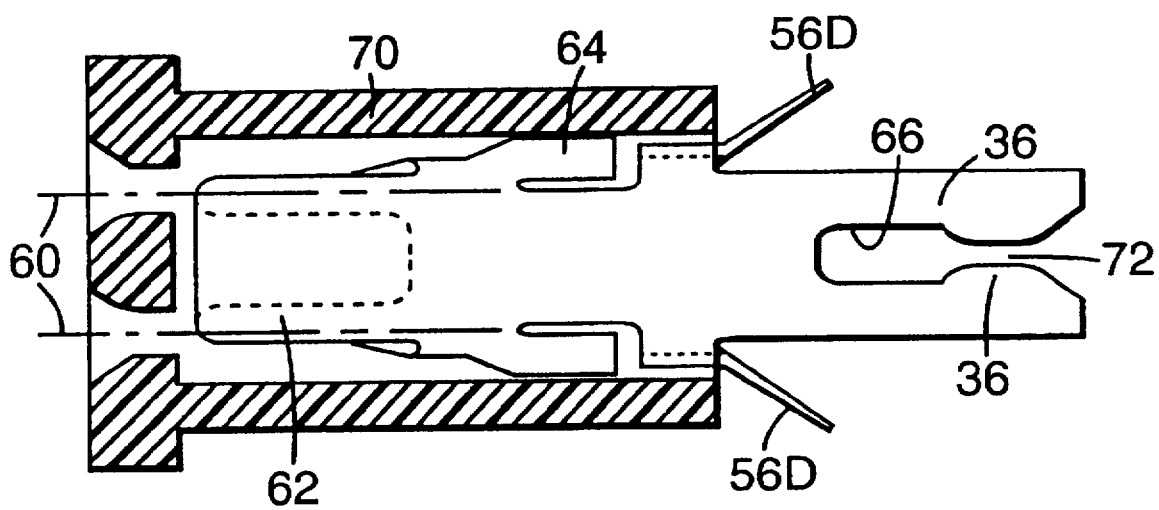
FIG. 5 is a sectional view of an alternate embodiment of the electrical coupling of FIG. 3.

Finally, with reference to FIG. 5, there is depicted a sectional view of an alternate embodiment of the electrical coupling of FIG. 3. As depicted in this view, the grounding clip is provided by forming a pair of symmetrically opposed compliant conductive members 56D integrally as part of the pair of electrical contacts 36. Further, as illustrated within FIG. 5, the contact may be formed as a single conductive member and inserted into an aperture within shell 70 and held in place by means of a pair of opposed lances 64. A printed circuit board or other planar substrate may then be inserted into aperture 72 until fully engaged with stop 66. Thereafter, when assembled with a planar substrate, such as that depicted within FIG. 4, the electrically conductive cover plates will create a ground path utilizing symmetrically opposed compliant conductive members 56D.

By utilizing a grounding clip which is constructed in the manner disclosed herein, a selected conductive element within planar substrate 42 may be directly coupled to the electrically conductive cover plates providing an efficient method for minimizing possible damage due to a built-up electrical charge and electromagnetic emissions from circuit card 10.

While the invention has been particularly shown and described with reference to a preferred embodiment, it will be understood by those skilled in the art that various changes in form and detail may be made therein without departing from the spirit and scope of the invention.

What is claimed is:

1. An electrical connector comprising:

a generally planar electrical coupling which includes a plurality of electrical contacts, wherein each of said plurality of electrical contacts is coupled to an associated electrical terminal adapted to mate with a generally planar electronic device; and a grounding clip integrally formed with at least one of said associated electrical terminals, said grounding clip having a conductive member extending therefrom adapted to physically engage a conductive cover panel of said generally planar electronic device coupled to said associated electrical terminals.

2. A generally planar electrical coupling which includes a plurality of electrical contacts, wherein each of said plurality of electrical contacts is coupled to an associated electrical terminal adapted to mate with a generally planar electronic device; and a grounding clip electrically connected to at least one of said associated electrical terminals, said grounding clip having a conductive member extending therefrom adapted to physically engage a conductive cover panel of said generally planar electronic device coupled to said associated electrical terminals.

* * * * *